United States Patent [19]
MacKew

[11] 3,831,694
[45] Aug. 27, 1974

[54] APPARATUS FOR MOVING VEHICLES AND THE LIKE

[75] Inventor: James MacKew, Fort Wayne, Ind.
[73] Assignee: Power Wheels Corp., Ft. Wayne, Ind.
[22] Filed: Mar. 5, 1973
[21] Appl. No.: 338,149

[52] U.S. Cl............ 180/19 R, 254/8 R, 254/133 R
[51] Int. Cl............................................ B62d 51/04
[58] Field of Search........ 180/19 R, 19 H, 19 S, 11; 254/8 R, 133 R

[56] References Cited
UNITED STATES PATENTS

| | | | |
|---|---|---|---|
| 1,471,695 | 10/1923 | Kelley et al. | 254/8 R |
| 2,626,671 | 1/1953 | Hardy et al. | 180/19 R X |
| 2,795,914 | 6/1957 | Smith | 180/19 R X |
| 3,166,141 | 1/1965 | Shields et al. | 180/19 R X |
| 3,179,196 | 4/1965 | Richardson | 180/19 R |
| 3,417,833 | 12/1968 | McRae | 180/19 R |

*Primary Examiner*—David Schonberg
*Assistant Examiner*—John A. Pekar
*Attorney, Agent, or Firm*—Albert L. Jeffers; Roger M. Rickert

[57] ABSTRACT

A two wheeled vehicle-like apparatus for moving automobiles or the like, and which apparatus has a pair of ground wheels independantly rotatable on a common axis. An electric motor is provided for driving the wheels and battery means are provided in the apparatus for supplying power to the electric motor. A handle is fixed to one end of the frame of the apparatus and a lifting arm extends outwardly and upwardly from the other side of the frame and has vehicle engaging means on the other end thereof to exert a lifting force on the vehicle being moved, thereby to transfer weight from the vehicle to the wheels of the apparatus.

4 Claims, 6 Drawing Figures

PATENTED AUG 27 1974 3,831,694

APPARATUS FOR MOVING VEHICLES AND THE LIKE

The present invention relates to an apparatus especially adapted for moving vehicles, and the like, and, more particularly, relates to a small compact carriage which can readily be operated by a single operation and which is capable of supporting at least a part of the weight of the vehicle being moved and to obtain the desired amount of traction for pushing the vehicle to a selected location. The apparatus can also be provided with a device for engaging and pulling the vehicle.

The apparatus disclosed herein represent a further development and improvement of apparatus disclosed in U.S. Pat. No. 3,417,833.

This apparatus is particularly adapted to move inoperative vehicles in and around automotive dealerships on the inside and outside of repair shops, showrooms, used car lots, public parking lots, toll road gates and other places, vehicles must on occasion, be moved about by some auxiliary means because the vehicle is either disabled, or its preferable to move it other than by its own power. It can take as many as four or five men to move vehicles which are inoperable and it is proposed by the present invention to provide a power actuated device which can be operated by a single individual, and without substantial manual effort, to effect the moving of such vehicles. A second person can be available for steering the disabled vehicle while it is being moved by the power actuated apparatus.

By availing of the power apparatus according to the present invention it becomes unnecessary for a substantial number of people to push a disabled vehicle and it is, therefore, possible economically to handle substantial numbers of cars with fewer people available, while at the same time reducing the possibility of injury to individuals from overexertion, which can be brought about by pushing heavy vehicles. Further, even if the vehicle is not disabled it can be moved about without starting the engine which is of advantage, especially in a closed space.

With the foregoing in mind, a principal object of the present invention is the provision of a compact and inexpensive power actuated device which can easily be operated by a single person to provide motive power for moving vehicles from one location to another.

A further object of the present invention is the provision of a simple inexpensive apparatus of the nature referred to which is easy to control and requires a minimum of manual effort during the operation thereof.

Still another object of the present invention is the provision of a simple but highly effective control arrangement for controlling the operation of the apparatus.

It is also an object of the present invention to provide an apparatus of the nature referred to in which vehicles having bumpers or other body members at different heights can be engaged and at least part of the weight thereof transferred to the wheels of the apparatus, while the apparatus is moving a vehicle, thereby to increase the traction with which the wheels of the apparatus engage the floor.

Still other objects and advantages of the present invention will become apparent upon reference to the following detailed description taken in connection with the accompanying drawings in which.

BRIEF SUMMARY OF THE INVENTION

The apparatus according to the present invention comprises a frame supported on two wheels rotatable on a common axis. The wheels are independantly rotatable and are driven by a battery powered electric motor which drives through a clutch and a reversing transmission and a differential to the respective wheels. A handle for manipulating the apparatus is connected to the frame on one side and includes controls for controlling the clutch and the energization of the motor and the transmission of the apparatus. From the side of the frame opposite the handle there extends an arm and on the outer end of which is attached a pusher member adapted for engaging the object to be pushed. In particular, the pusher member is adapted to engage beneath and behind the bumper of a vehicle in such a manner that a portion of the weight of the vehicle is transferred to the wheels of the apparatus, thereby increasing the traction thereof and also reducing the resistance the vehicle offers to movement. The pusher member is especially arranged for engaging bumpers of conventional height or a vehicle body member at a greater height, at approximately 30° to 45° of approach from the ground contact of its wheels to where it contacts the bumper plate or a member of the vehicle frame, and is also arranged to pivot about a vertical axis to facilitate in manipulating a vehicle around corners. Advantageously, the arm may also have a pull hook that can be connected thereto so that vehicles can be moved in the rearward direction, if so desired. The distance from the point of contact of the drive wheels of this apparatus to the point of contact with the vehicle via the pusher member is held to limits so that the more resistance there is against the forward or rearward travel the more weight there is transferred to the wheels and consequently more traction or tractive capability to move the inoperative vehicle.

DETAILED DESCRIPTION OF THE INVENTION

Figure 1:
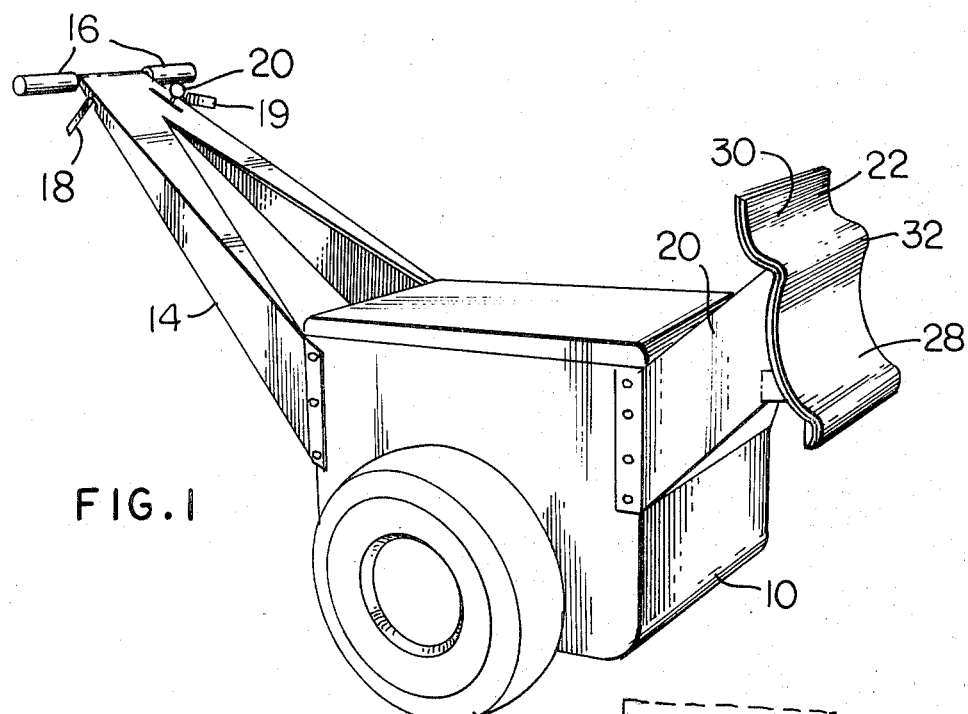
FIG. 1 is a perspective view of the apparatus according to the present invention.
Figure 2:
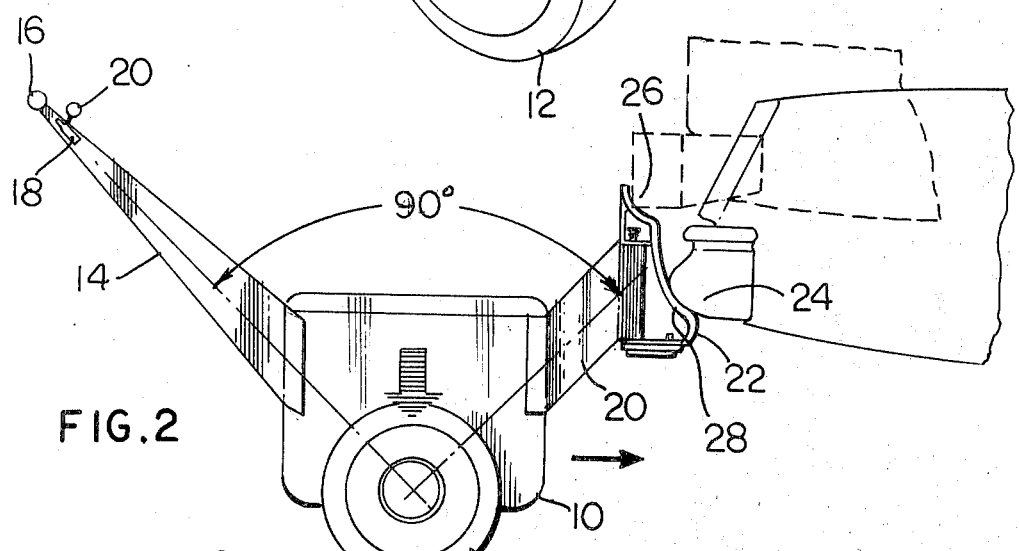
FIG. 2 is a side view thereof showing the manner in which the apparatus engages a vehicle to be moved thereby.

Referring to the drawings somewhat more in detail, the apparatus according to the present invention as illustrated in FIGS. 1 and 2, will be seen to comprise a central frame portion 10 to which is connected a pair of wheels 12, one of which is shown in FIG. 1. These wheels are in about the middle of the length of frame 10 and are rotatable on a common axis. Extending upwardly and rearwardly from frame 10 on one side is the manipulating handle member 14 which is fixed to the frame at the one end. The handle member includes hand grips 16, together with control elements 18 and 19, one of which is provided for actuating a clutch in the drive train leading to the wheels and the other of which is adapted for controlling a brake, also in the drive train. Furthermore, a transmission gear shift lever is located close at hand. The brake actuating lever at the free end of the handle is arranged for locking in brake actuating position or a safety measure.

On the front side of the apparatus there is a pusher arm 20 that is fixed at one end to the frame and which arm extends forwardly and upwardly from frame 10. Arm 20, on the upper side, makes an angle of about 45° to the horizontal and, on the lower side, makes an angle of about 30° to the horizontal. On the outer end of arm 20 there is mounted a pusher member which comprises a somewhat wave shaped member 22, preferably of steel, with a rubber-like facing thereon. Member 22 inclines toward the rear in the upward direction at an angle of about 30° to the vertical. The entire face of the pusher member 22 is at approximately equal distance from the center of the axle of the apparatus.

The pusher member 22 is so shaped that the lower portion thereof is adapted for engaging from the rear and below a vehicle bumper as at 24, whereas the upper portion of pusher member 22 is adapted for engaging beneath a higher bumper, as indicated at 26, and which might be a high bumper or a like member on a truck, bus or trailer.

To this end, the pusher member 22 has a lower curved portion 28 concave forwardly and having a fairly large curvature and an upper curved portion 30, also concave forwardly and which may have a somewhat smaller radius of curvature with a reversely curved portion 32 interconnecting portions 28 and 30.

Figure 4:
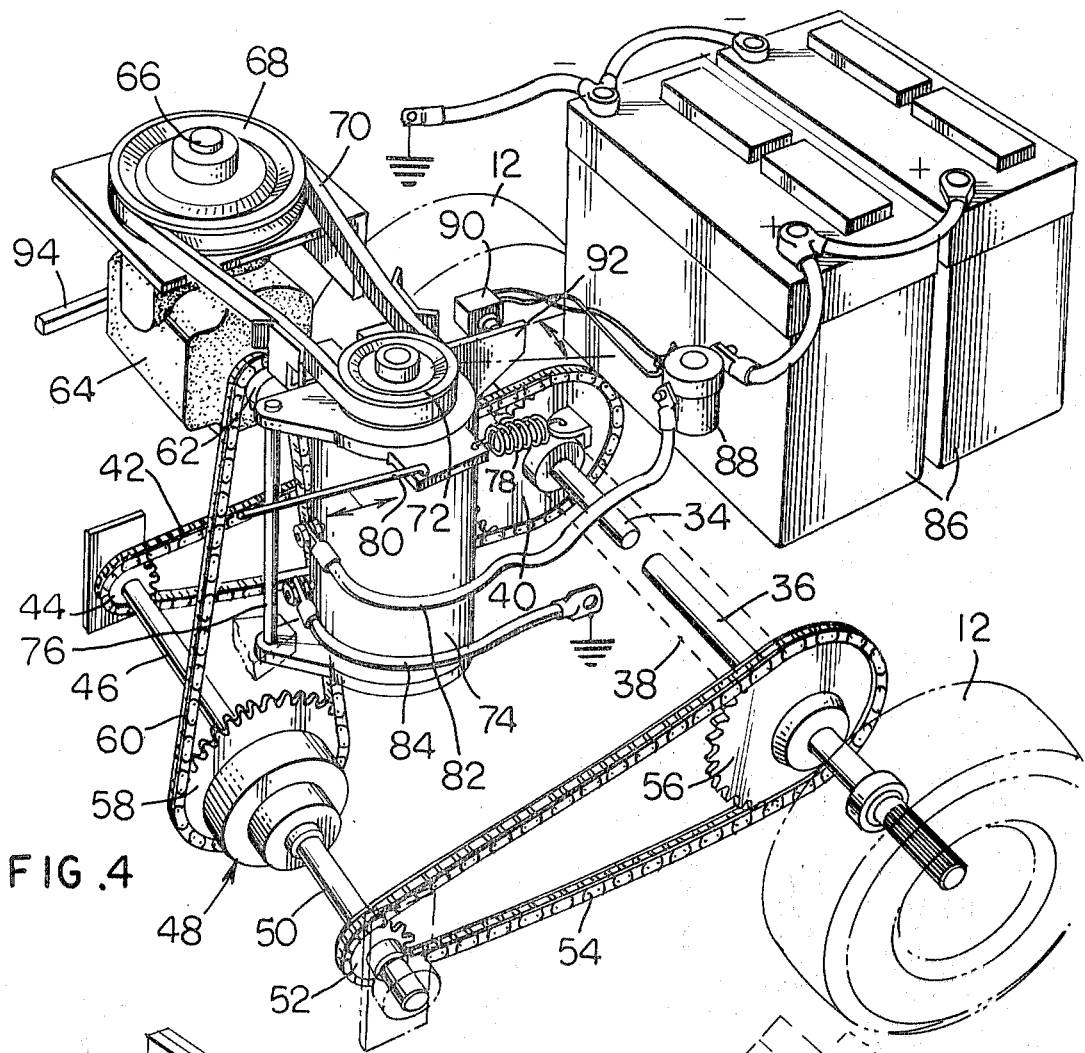
FIG. 4 is a perspective view with the casing of the apparatus removed showing the operative components thereof more in detail.

The operative components of the apparatus are shown in perspective in FIG. 4, with the major portion of the frame removed so that all the components are clearly visible. In FIG. 4, the wheels 12 will be seen to be mounted on independant axle portions 34 and 36 which are rotatably supported in the frame and the inner ends of which may extend into a tubular bearing housing 38. Axle portion 34 has a sprocket 40 thereon about which a drive chain 42 is entrained and which extends rearwardly and engages a small sprocket 44 on a shaft 46 which forms one output member of a differential generally indicated at 48. Differential 48 has another output member in the form of shaft 50 on which a small sprocket 52 is mounted and about which is entrained a drive chain 54 which passes forwardly and about sprocket 56 fixed to shaft 36. Suitable bearings are provided in the frame for rotatably supporting the shafts therein.

Differential 48 has an input member to which is fixed a sprocket 58 about which is entrained a drive chain 60. Chain 60 extends upwardly and about a sprocket 62 mounted on the output shaft of a reversing transmission 64. Transmission 64, and which may provide for speed reduction and a reverse gear, has an input shaft 66 on which is mounted a pulley 68 about which is entrained a drive belt 70, a V-belt, for example, and which belt also passes around a pulley 72 mounted on the output shaft of an electric motor 74. The frame of electric motor 74 is pivotally supported on a vertical shaft 76 which is stationarily mounted in the frame of the apparatus and a tension spring 78 is provided acting between the frame and the frame of motor 74 in such a direction as normally to cause belt 70 to fall slack and interrupt the driving connection between motor 74 and the input shaft of speed reducer 64.

The frame of the motor also has connected thereto a clutch rod 80 which leads upwardly along handle member 14 to be connected with the pertaining one of controls 18, 20 so that the operator of the apparatus can selectively cause the motor 74 to be moved bodily to cause the belt 70 to tighten up into driving engagement with pulleys 68 and 72 or to go slack therebetween.

The electric motor is actuated by electric current conducted thereto via wires 82 and 84 which lead to the respective positive and negative polls of battery means 86, also carried in frame 10 of the apparatus.

There is preferably interposed in one or both of the aforementioned electrical connections relay 88 which forms an electrically operated switch is under the control of a limit switch 90 which is normally closed but which is opened by a plate 92 carried by the frame of motor 74 when the motor pivots to belt slack position under the influence of spring 78.

The aforementioned transmission 64 has forward, neutral and reverse positions into which the transmission can be placed by manipulation of a shift lever 94 associated with the transmission. Shift lever 94 is connected via a rod, or the like, with a control lever by the handle member 14 of frame 10.

Figure 3:
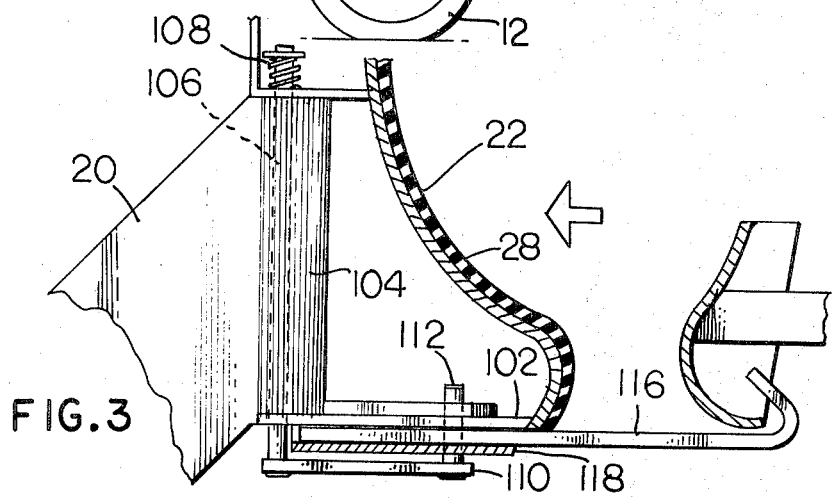
FIG. 3 is a somewhat enlarged fragmentary view showing the pusher portion of the apparatus more in detail, and also showing a pull hook that can be associated therewith.
Figure 5:
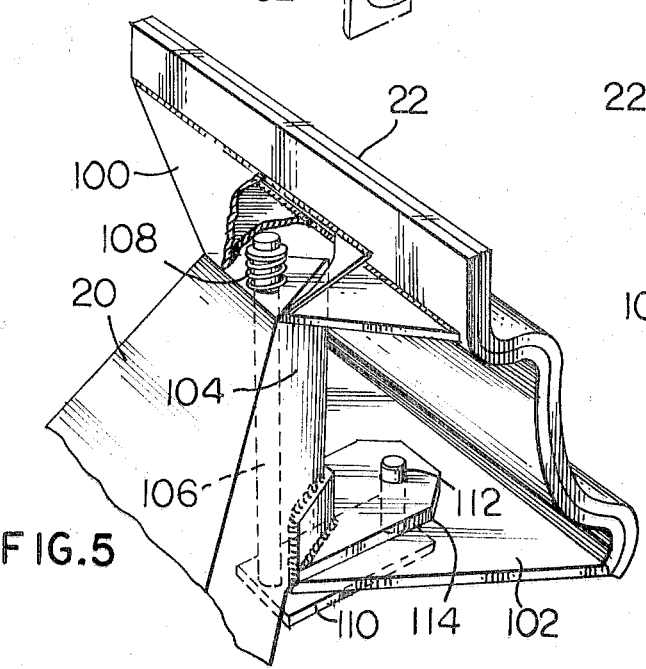
FIG. 5 is a perspective view showing more in detail the pusher member of the apparatus.
Figure 6:
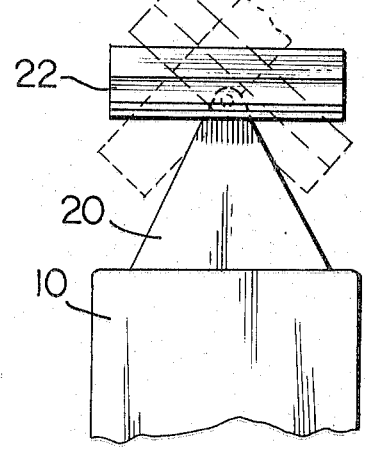
FIG. 6 is a plan view showing how the pusher member can be permitted to tilt around a vertical axis to facilitate maneuvering vehicles around corners.

The arrangement of the pusher member 22 is more clearly illustrated in FIGS. 3, 5 and 6. The pusher member has fixed to the back toward the top thereof a right angled bracket 100 and to the bottom is a rearwardly extending plate portion 102. On the forward end of the pusher arm 20 there is a vertical box-like frame 104 through which extends a vertical shaft 106 that pivotally engages the horizontal portion of bracket 100 and the plate 102 so that the pusher member is pivotal on the pusher arm into various angular positions as shown in FIG. 6.

Shaft member 106 is biased upwardly by a spring 108 and on the bottom carries a forwardly extending arm 110 on the outer end of which is an upward extending pin 112. A plate 114 is fixed to the forward side of frame 104 and is parallel to and adjacent plate 102 on the bottom of pusher member 22. The pin 112 engages an aperture in plate 102 and, when engaged with an aperture provided in plate 114, the pusher member is locked against rotation. However, by pushing downwardly on shaft member 106 and rotating the shaft member so that pin 112 is prevented from entering at least the aperture in plate 114, the pusher member becomes free to pivot as shown in FIG. 6.

Pin 112 can also be availed of for engaging an aperture in the pull hook 116 shown in FIG. 3 which can be engaged with pin 112 when shaft member 106 is pressed downwardly. Pull hook 116 may be freely pivotal on pin 112 or it may be retained against pivotal movement by the sides of the flanges 118 dependant from the underside of plate 102 of pusher member 22.

There may be mounted within the frame, if desired, a charging device in connection with the batteries so that, during off periods when the pushing device is not in use, the charging device can be connected to an electric outlet and the batteries charged up.

It will be apparent that the pusher device according to the present invention has particular merit in garages, showrooms, used car and public parking lots, and the like, for moving cars, small trucks, buses and other like vehicles; that it creates no pollution; and that substantially less man power is required to move vehicles than was heretofore required in the absence of such equipment.

In the apparatus of the present invention, the position of the pusher member and the angle of the pusher arm relative to the wheels of the apparatus is of importance so the pusher member will not only lift the vehicle being pushed but also exert a horizontal force thereon. If resistance to horizontal movement is encountered, the wheels of the apparatus will take a part of the weight of the vehicle and will be pressed more strongly against the surface therebeneath for greater tractive effort.

Modifications may be made within the scope of the appended claims.

What is claimed is:

1. An apparatus for moving vehicles comprising; a frame, wheels supporting said frame for movement over a surface, a handle member rigidly connected to the frame and extending outwardly and upwardly from one side thereof, an arm rigidly connected at one end to said frame and extending outwardly and upwardly from the side opposite said one side thereof, vehicle engaging means on the free end of said arm including a pusher member adapted to engage a vehicle from beneath and in the horizontal direction, a differential in said frame having an output member connected to a wheel and also having an input member, an electric motor having an output shaft to provide a source of power, a transmission having an output shaft connected to said input member and an input shaft connected to said electric motor, a pulley on each of the output shaft of said motor and the input shaft of said transmission, a belt entrained about said pulleys, means pivotally supporting said motor in said frame for movement thereof toward and away from said transmission to make said belt so slack and taut respectively, a spring biasing said motor in belt slackening direction, means connected to said motor and operable from the free end of said handle member for moving said motor in belt tightening direction, a source of electrical energy carried by said frame, switch means electrically connecting said source of electrical energy to said motor, and means operable by said motor when the motor moves into belt slackening position for opening said switch means.

2. An apparatus according to claim 1 which includes pivot means having means for locking said pusher member to said arm in at least one pivoted position of said pusher member on said arm.

3. An apparatus according to claim 2 in which said pivot means comprises a shaft vertically moveable on the free end of said arm and spring urged upwardly thereon, an upwardly directed pin carried by said shaft in radially spaced relation thereto, upper and lower bracket members fixed to the back of said pusher member and engaging upper and lower regions of said shaft, an aperture in the lower bracket member for receiving said pin, and a plate fixed to the free end of said arm adjacent said lower bracket member also having an aperture therein to receive said pin.

4. An apparatus according to claim 1 which includes a hook element adapted for detachable connection to the free end of said arm for exerting a pull on a vehicle engaged by the hook element.

* * * * *